(12) United States Patent
Hu

(10) Patent No.: US 8,266,249 B2
(45) Date of Patent: Sep. 11, 2012

(54) PROVIDING REMOTE ACCESS TO MULTIMEDIA CONTENT

(75) Inventor: Weidong Hu, Austin, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 347 days.

(21) Appl. No.: 12/196,825

(22) Filed: Aug. 22, 2008

(65) Prior Publication Data

US 2010/0049824 A1    Feb. 25, 2010

(51) Int. Cl.
*G06F 15/16*    (2006.01)

(52) U.S. Cl. .......................... 709/219; 709/225; 709/229

(58) Field of Classification Search .................. 709/203, 709/204, 217–219, 225, 229; 705/1, 27
See application file for complete search history.

(56) References Cited

U.S. PATENT DOCUMENTS

| 7,305,357 B2* | 12/2007 | Hamilton ........................ 705/27 |
| 7,496,652 B2* | 2/2009 | Pezzutti ........................ 709/223 |
| 7,812,854 B1* | 10/2010 | Delker et al. ............... 455/414.1 |
| 2005/0114900 A1* | 5/2005 | Ladd et al. ..................... 725/100 |
| 2006/0205410 A1* | 9/2006 | Black ............................ 455/445 |
| 2007/0217436 A1* | 9/2007 | Markley et al. ............... 370/401 |
| 2007/0276925 A1 | 11/2007 | La Joie et al. |
| 2008/0112405 A1* | 5/2008 | Cholas et al. ................. 370/389 |

OTHER PUBLICATIONS

Sling Media—SlingPlayer Mobile Overview, http://www.slingmedia.com/go/spm, accessed Aug. 22, 2008, 2 pages.

\* cited by examiner

*Primary Examiner* — Patrice Winder
(74) *Attorney, Agent, or Firm* — Jackson Walker L.L.P.

(57) ABSTRACT

Remote access to multimedia content is provided to hardware devices that have been predesignated as approved. For example, a customer premises equipment (CPE) device such as a set-top box may transmit digital television content to a mobile telephone. The multimedia content may be simulcast to multiple remote hardware devices by the CPE device.

23 Claims, 5 Drawing Sheets

PROVIDING REMOTE ACCESS TO MULTIMEDIA CONTENT

BACKGROUND

1. Field of the Disclosure

The present disclosure generally relates to multimedia content provider networks and more particularly to providing remote access to digital television content.

2. Description of the Related Art

Multimedia content provider networks provide users with access to multimedia content through customer premises equipment (CPE). When a user is away from the location of the CPE, without some form of remote access, the user generally does not have access to the content provided by the CPE.

DESCRIPTION OF THE EMBODIMENT(S)

Figure 1:
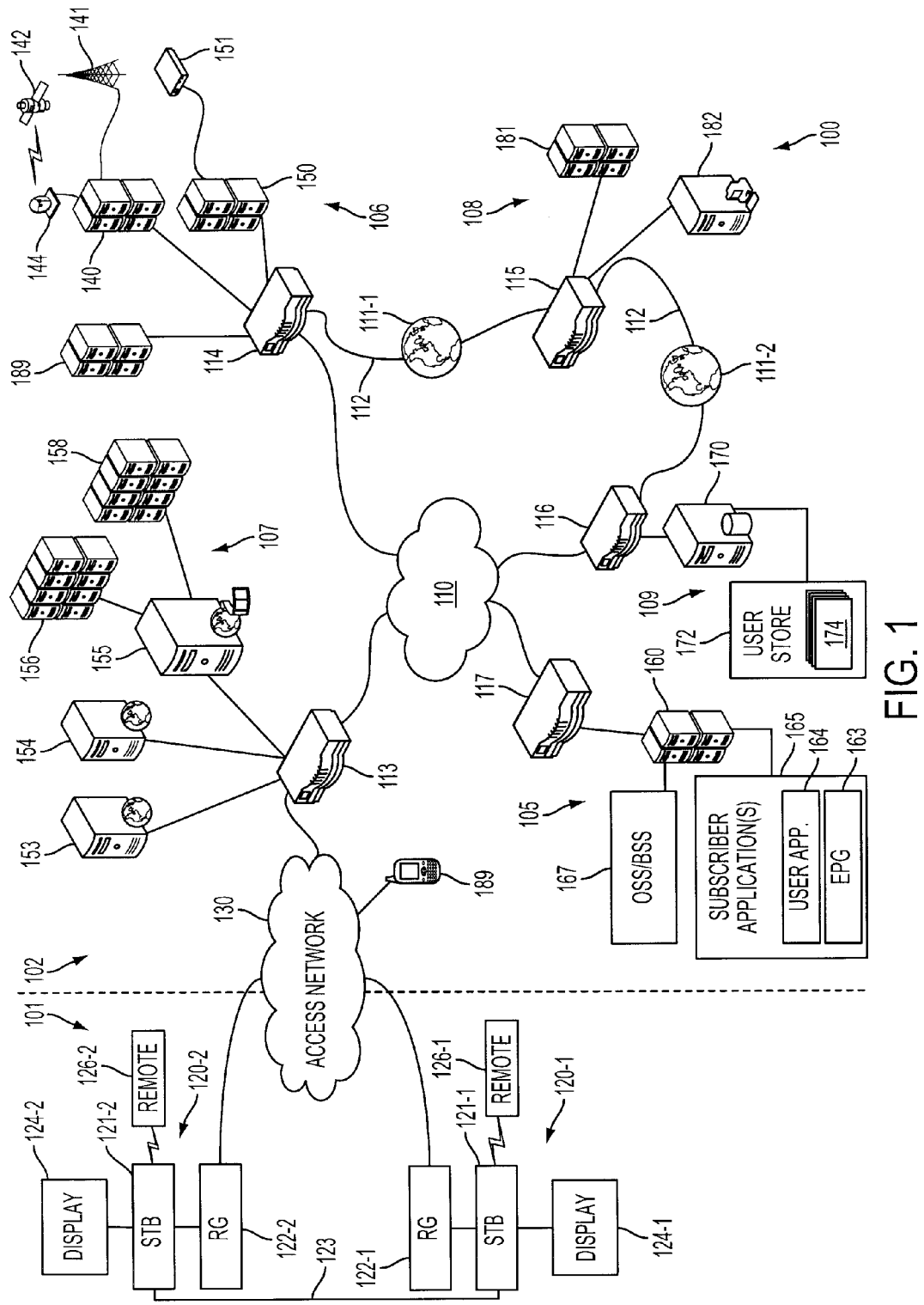
FIG. 1 illustrates a representative Internet Protocol Television (IPTV) architecture for providing remote access to multimedia content in accordance with disclosed embodiments.

In one aspect, a CPE device provides a remote hardware device with access to multimedia content. The CPE device, for example, may be an STB or may be integrated into a television. The CPE device has a first input for receiving a hardware identifier that is associated with the remote hardware device. When the hardware device is received by the CPE device, the remote hardware device is pre-designated as an approved device. The CPE device further includes a second input for receiving a request from the remote hardware device to remotely receive multimedia content. For example, the user of a mobile telephone may request remote access to multimedia content from the CPE device and initiate a sequence that results in the mobile telephone receiving the multimedia content from the CPE device. The CPE device further includes a processor that verifies that the remote hardware device has been pre-designated as an approved device. The processor encodes the multimedia content for transmission to the remote hardware device upon verification that the remote hardware device is pre-designated as approved. If the remote hardware device is not pre-designated as approved, the processor does not encode the digital content for transmission to the remote hardware device. The CPE device further includes a receiver for receiving the multimedia content from a content provider network. For example, an STB may receive digital television content from an IPTV provider network. The CPE further includes a transmitter that transmits the encoded multimedia content to the remote hardware device. In some embodiments, transmitting the encoded multimedia content includes streaming the encoded multimedia content for play on the remote hardware device substantially in real time as it is streamed to the CPE device. The CPE device may play the encoded multimedia content as it is received from the CPE device or it may store the multimedia content for later play.

In another aspect, a computer program product is disclosed that has instructions for receiving a globally unique identifier of a hardware device, and in response to verifying the globally unique identifier, the computer program instructions receive a content request from the hardware device, encode the multimedia content received from a provider network for transmission to the hardware device, and transmit the encoded multimedia content to the hardware device. In some embodiments, further instructions transmit data for a graphical user interface (GUI) to the remote hardware device. The GUI enables remote control of transmission of the encoded multimedia content. The input from the remote hardware device may include Hyper Text Markup Language (HTML) input, Extensible Markup Language (XML) input, or input formatted with other protocols.

In still another aspect, a method of providing a remote hardware device with access to multimedia content includes detecting a globally unique identifier associated with the remote hardware device, receiving a request from the remote hardware device to remotely receive the multimedia content, and verifying that the hardware identifier corresponds to a pre-approved hardware device. The method further includes receiving multimedia content from a multimedia content provider network and encoding the multimedia content for transmission to the remote hardware device upon verification that the remote hardware device has been pre-approved. If the multimedia device has not been pre-approved, the multimedia content is not encoded for transmission to the remote hardware device. The method further includes receiving input from the remote hardware device to control the transmission of the multimedia content, and transmitting the encoded multimedia content to the remote hardware device in response to the received input.

In the following description, examples are set forth with sufficient detail to enable one of ordinary skill in the art to practice the disclosed subject matter without undue experimentation. It should be apparent to a person of ordinary skill that the disclosed examples are not exhaustive of all possible embodiments. Regarding reference numerals used to describe elements in the figures, a hyphenated form of a reference numeral refers to a specific instance of an element and an un-hyphenated form of the reference numeral refers to the element generically or collectively. Thus, for example, element 121-1 refers to an instance of an STB, which may be referred to collectively as STBs 121 and any one of which may be referred to generically as an STB 121. Before describing other details of embodied methods and devices, selected aspects of multimedia content provider networks that provide multimedia programs are described to provide further context.

Television programs, video on-demand (VOD) movies, digital television content, music programming, and a variety of other types of multimedia content may be distributed to multiple users (e.g., subscribers) over various types of networks. Suitable types of networks that may be configured to support the provisioning of multimedia content services by a service provider include, as examples, telephony-based networks, coaxial-based networks, satellite-based networks, and the like.

In some networks including, for example, traditional coaxial-based "cable" networks, whether analog or digital, a service provider distributes a mixed signal that includes a large number of multimedia content channels (also referred to herein as "channels"), each occupying a different frequency band or frequency channel, through a coaxial cable, a fiber-optic cable, or a combination of the two. The bandwidth required to transport simultaneously a large number of multimedia channels may challenge the bandwidth capacity of cable-based networks. In these types of networks, a tuner within an STB, television, or other form of receiver is required to select a channel from the mixed signal for playing or recording. A user wishing to play or record multiple channels typically needs to have distinct tuners for each desired channel. This is an inherent limitation of cable networks and other mixed signal networks.

In contrast to mixed signal networks, IPTV networks generally distribute content to a user only in response to a user request so that, at any given time, the number of content channels being provided to a user is relatively small, e.g., one channel for each operating television plus possibly one or two channels for simultaneous recording. As suggested by the name, IPTV networks typically employ IP and other open, mature, and pervasive networking technologies to distribute multimedia content. Instead of being associated with a particular frequency band, an IPTV television program, movie, or other form of multimedia content is a packet-based stream that corresponds to a particular network endpoint, e.g., an IP address and a transport layer port number. In these networks, the concept of a channel is inherently distinct from the frequency channels native to mixed signal networks. Moreover, whereas a mixed signal network requires a hardware intensive tuner for every channel to be played, IPTV channels can be "tuned" simply by transmitting to a server an indication of a network endpoint that is associated with the desired channel.

IPTV may be implemented, at least in part, over existing infrastructure including, for example, a proprietary network that may include existing telephone lines, possibly in combination with CPE including, for example, a digital subscriber line (DSL) modem in communication with a STB, a display, and other appropriate equipment to receive multimedia content and convert it into usable form. In some implementations, a core portion of an IPTV network is implemented with fiber optic cables while the so-called "last mile" may include conventional, unshielded, twisted-pair, copper cables.

IPTV networks support bidirectional (i.e., two-way) communication between a user's CPE and a service provider's equipment. Bidirectional communication allows a service provider to deploy advanced features, such as VOD, pay-per-view, advanced programming information (e.g., sophisticated and customizable electronic program guides (EPGs)), and the like. Bidirectional networks may also enable a service provider to collect information related to a user's preferences, whether for purposes of providing preference-based features to the user, providing potentially valuable information to service providers, or providing potentially lucrative information to content providers and others.

Referring now to the drawings, FIG. 1 illustrates selected aspects of a multimedia content distribution network (MCDN) 100 for providing remote access to multimedia content in accordance with disclosed embodiments. MCDN 100, as shown, is a multimedia content provider network that may be generally divided into a client side 101 and a service provider side 102 (a.k.a., server side 102). Client side 101 includes all or most of the resources depicted to the left of access network 130 while server side 102 encompasses the remainder.

Client side 101 and server side 102 are linked by access network 130. In embodiments of MCDN 100 that leverage telephony hardware and infrastructure, access network 130 may include the "local loop" or "last mile," which refers to the physical cables that connect a subscriber's home or business to a local exchange. In these embodiments, the physical layer of access network 130 may include varying ratios of twisted pair copper cables and fiber optics cables. In a fiber to the curb (FTTC) access network, the last mile portion that employs copper is generally less than approximately 300 miles in length. In fiber to the home (FTTH) access networks, fiber optic cables extend all the way to the premises of the subscriber.

Access network 130 may include hardware and firmware to perform signal translation when access network 130 includes multiple types of physical media. For example, an access network that includes twisted-pair telephone lines to deliver multimedia content to consumers may utilize DSL. In embodiments of access network 130 that implement FTTC, a DSL access multiplexer (DSLAM) may be used within access network 130 to transfer signals containing multimedia content from optical fiber to copper wire for DSL delivery to consumers.

Access network 130 may transmit radio frequency (RF) signals over coaxial cables. In these embodiments, access network 130 may utilize quadrature amplitude modulation (QAM) equipment for downstream traffic. In these embodiments, access network 130 may receive upstream traffic from a consumer's location using quadrature phase shift keying (QPSK) modulated RF signals. In such embodiments, a cable modem termination system (CMTS) may be used to mediate between IP-based traffic on private network 110 and access network 130.

Services provided by the server side resources as shown in FIG. 1 may be distributed over a private network 110. In some embodiments, private network 110 is referred to as a "core network." In at least some embodiments, private network 110 includes a fiber optic wide area network (WAN), referred to herein as the fiber backbone, and one or more video hub offices (VHOs). In large-scale implementations of MCDN 100, which may cover a geographic region comparable, for example, to the region served by telephony-based broadband services, private network 110 includes a hierarchy of VHOs.

A national VHO, for example, may deliver national content feeds to several regional VHOs, each of which may include its own acquisition resources to acquire local content, such as the local affiliate of a national network, and to inject local content such as advertising and public service announcements from local entities. The regional VHOs may then deliver the local and national content to users served by the regional VHO. The hierarchical arrangement of VHOs, in addition to facilitating localized or regionalized content provisioning, may conserve bandwidth by limiting the content that is transmitted over the core network and injecting regional content "downstream" from the core network.

Segments of private network 110, as shown in FIG. 1, are connected together with a plurality of network switching and routing devices referred to simply as switches 113 through 117. The depicted switches include client facing switch 113, acquisition switch 114, operations-systems-support/business-systems-support (OSS/BSS) switch 115, database switch 116, and an application switch 117. In addition to providing routing/switching functionality, switches 113 through 117 preferably include hardware or firmware firewalls, not depicted, that maintain the security and privacy of network 110. Other portions of MCDN 100 may communicate over a public network 112, including, for example, Internet or other type of web-network where the public network 112 is signified in FIG. 1 by the World Wide Web icons 111.

As shown in FIG. 1, client side 101 of MCDN 100 depicts two of a potentially large number of client side resources referred to herein simply as client(s) 120. Each client 120, as shown, includes an STB 121, a residential gateway (RG) 122, a display 124, and a remote control device 126. In the depicted embodiment, STB 121 communicates with server side devices through access network 130 via RG 122.

As shown in FIG. 1, RG 122 may include elements of a broadband modem such as a DSL or cable modem, as well as elements of a firewall, router, and/or access point for an Ethernet or other suitable local area network (LAN) 123. In this embodiment, STB 121 is a uniquely addressable Ethernet compliant device. In some embodiments, display 124 may be any National Television System Committee (NTSC) and/or Phase Alternating Line (PAL) compliant display device. Both STB 121 and display 124 may include any form of conventional frequency tuner. Remote control device 126 communicates wirelessly with STB 121 using infrared (IR) or RF signaling. STB 121-1 and STB 121-2, as shown, may communicate through LAN 123 in accordance with disclosed embodiments to select multimedia programs for viewing.

In IPTV compliant implementations of MCDN 100, clients 120 are configured to receive packet-based multimedia streams from access network 130 and process the streams for presentation on displays 124. In addition, clients 120 are network-aware resources that may facilitate bidirectional-networked communications with server side 102 resources to support network hosted services and features. Because clients 120 are configured to process multimedia content streams while simultaneously supporting more traditional web-like communications, clients 120 may support or comply with a variety of different types of network protocols including streaming protocols such as real-time transport protocol (RTP) over user datagram protocol/internet protocol (UDP/IP) as well as web protocols such as hypertext transport protocol (HTTP) over transport control protocol (TCP/IP).

The server side 102 of MCDN 100 as depicted in FIG. 1 emphasizes network capabilities including application resources 105, which may have access to database resources 109, content acquisition resources 106, content delivery resources 107, and OSS/BSS resources 108.

Before distributing multimedia content to users, MCDN 100 first obtains multimedia content from content providers. To that end, acquisition resources 106 encompass various systems and devices to acquire multimedia content, reformat it when necessary, and process it for delivery to subscribers over private network 110 and access network 130.

Acquisition resources 106 may include, for example, systems for capturing analog and/or digital content feeds, either directly from a content provider or from a content aggregation facility. Content feeds transmitted via VHF/UHF broadcast signals may be captured by an antenna 141 and delivered to live acquisition server 140. Similarly, live acquisition server 140 may capture downlinked signals transmitted by a satellite 142 and received by a parabolic dish 144. In addition, live acquisition server 140 may acquire programming feeds transmitted via high-speed fiber feeds or other suitable transmission means. Acquisition resources 106 may further include signal conditioning systems and content preparation systems for encoding content.

As depicted in FIG. 1, content acquisition resources 106 include a VOD acquisition server 150. VOD acquisition server 150 receives content from one or more VOD sources that may be external to the MCDN 100 including, as examples, discs represented by a DVD player 151, or transmitted feeds (not shown). VOD acquisition server 150 may temporarily store multimedia content for transmission to a VOD delivery server 158 in communication with client-facing switch 113.

After acquiring multimedia content, acquisition resources 106 may transmit acquired content over private network 110, for example, to one or more servers in content delivery resources 107. As shown, live acquisition server 140 is communicatively coupled to encoder 189 which, prior to transmission, encodes acquired content using for example, MPEG-2, H.263, MPEG-4, H.264, a Windows Media Video (WMV) family codec, or another suitable video codec.

Content delivery resources 107, as shown in FIG. 1, are in communication with private network 110 via client facing switch 113. In the depicted implementation, content delivery resources 107 include a content delivery server 155 in communication with a live or real-time content server 156 and a VOD delivery server 158. For purposes of this disclosure, the use of the term "live" or "real-time" in connection with content server 156 is intended primarily to distinguish the applicable content from the content provided by VOD delivery server 158. The content provided by a VOD server is sometimes referred to as time-shifted content to emphasize the ability to obtain and view VOD content substantially without regard to the time of day or the day of week.

Content delivery server 155, in conjunction with live content server 156 and VOD delivery server 158, responds to user requests for content by providing the requested content to the user. The content delivery resources 107 are, in some embodiments, responsible for creating video streams that are suitable for transmission over private network 110 and/or access network 130. In some embodiments, creating video streams from the stored content generally includes generating data packets by encapsulating relatively small segments of the stored content according to the network communication protocol stack in use. These data packets are then transmitted across a network to a receiver (e.g., STB 121 of client 120), where the content is parsed from individual packets and re-assembled into multimedia content suitable for processing by a decoder.

User requests received by content delivery server 155 may include an indication of the content that is being requested. In some embodiments, this indication includes a network endpoint associated with the desired content. The network endpoint may include an IP address and a transport layer port number. For example, a particular local broadcast television station may be associated with a particular channel and the feed for that channel may be associated with a particular IP address and transport layer port number. When a user wishes to view the station, the user may interact with remote control device 126 to send a signal to STB 121 indicating a request for the particular channel. When STB 121 responds to the remote control signal, the STB 121 changes to the requested channel by transmitting a request that includes an indication of the network endpoint associated with the desired channel to content delivery server 155.

Content delivery server 155 may respond to such requests by making a streaming video or audio signal accessible to the user. Content delivery server 155 may employ a multicast protocol to deliver a single originating stream to multiple clients. When a new user requests the content associated with a multicast stream, there may be latency associated with updating the multicast information to reflect the new user as a part of the multicast group. To avoid exposing this undesirable latency to a user, content delivery server 155 may temporarily unicast a stream to the requesting user. When the user is ultimately enrolled in the multicast group, the unicast stream is terminated and the user receives the multicast stream. Multicasting desirably reduces bandwidth consumption by reducing the number of streams that must be transmitted over the access network 130 to clients 120.

As illustrated in FIG. 1, a client-facing switch 113 provides a conduit between client side 101, including client 120, and server side 102. Client-facing switch 113, as shown, is so-named because it connects directly to the client 120 via access network 130 and it provides the network connectivity of IPTV services to users' locations. To deliver multimedia content, client-facing switch 113 may employ any of various existing or future Internet protocols for providing reliable real-time streaming multimedia content. In addition to the TCP, UDP, and HTTP protocols referenced above, such protocols may use, in various combinations, other protocols including, RTP, real-time control protocol (RTCP), file transfer protocol (FTP), and real-time streaming protocol (RTSP), as examples.

In some embodiments, client-facing switch 113 routes multimedia content encapsulated into IP packets over access network 130. For example, an MPEG-2 transport stream may be sent, in which the transport stream consists of a series of 188-byte transport packets, for example. Client-facing switch 113, as shown, is coupled to a content delivery server 155, acquisition switch 114, applications switch 117, a client gateway 153, and a terminal server 154 that is operable to provide terminal devices with a connection point to the private network 110. Client gateway 153 may provide subscriber access to private network 110 and the resources coupled thereto.

In some embodiments, STB 121 may access MCDN 100 using information received from client gateway 153. Subscriber devices may access client gateway 153 and client gateway 153 may then allow such devices to access the private network 110 once the devices are authenticated or verified. Similarly, client gateway 153 may prevent unauthorized devices, such as hacker computers or stolen STBs, from accessing the private network 110. Accordingly, in some embodiments, when an STB 121 accesses MCDN 100, client gateway 153 verifies subscriber information by communicating with user store 172 via the private network 110. Client gateway 153 may verify billing information and subscriber status by communicating with an OSS/BSS gateway 167. OSS/BSS gateway 167 may transmit a query to the OSS/BSS server 181 via an OSS/BSS switch 115 that may be connected to a public network 112. Upon client gateway 153 confirming subscriber and/or billing information, client gateway 153 may allow STB 121 access to IPTV content, VOD content, and other services. If client gateway 153 cannot verify subscriber information (i.e., user information) for STB 121, for example, because it is connected to an unauthorized local loop or RG, client gateway 153 may block transmissions to and from STB 121 beyond the private access network 130. OSS/BSS server 181 hosts operations support services including remote management via a management server 182. OSS/BSS resources 108 may include a monitor server (not depicted) that monitors network devices within or coupled to MCDN 100 via, for example, a simple network management protocol (SNMP).

MCDN 100, as depicted, includes application resources 105, which communicate with private network 110 via application switch 117. Application resources 105 as shown include an application server 160 operable to host or otherwise facilitate one or more subscriber applications 165 that may be made available to system subscribers. For example, subscriber applications 165 as shown include an EPG application 163. Subscriber applications 165 may include other applications as well. In addition to subscriber applications 165, application server 160 may host or provide a gateway to operation support systems and/or business support systems. In some embodiments, communication between application server 160 and the applications that it hosts and/or communication between application server 160 and client 120 may be via a conventional web based protocol stack such as HTTP over TCP/IP or HTTP over UDP/IP.

Application server 160 as shown also hosts an application referred to generically as user application 164. User application 164 represents an application that may deliver a value added feature to a user, who may be a subscriber to a service provided by MCDN 100. For example, in accordance with disclosed embodiments, user application 164 may be an application that assists with STBs 121 providing remote access to mobile telephone 189 to multimedia content received over MCDN 100. User application 164, as illustrated in FIG. 1, emphasizes the ability to extend the network's capabilities by implementing a network-hosted application. Because the application resides on the network, it generally does not impose any significant requirements or imply any substantial modifications to client 120 including STB 121. In some instances, an STB 121 may require knowledge of a network address associated with user application 164, but STB 121 and the other components of client 120 are largely unaffected.

As shown in FIG. 1, a database switch 116, as connected to applications switch 117, provides access to database resources 109. Database resources 109 include a database server 170 that manages a system storage resource 172, also referred to herein as user store 172. User store 172, as shown, includes one or more user profiles 174 where each user profile includes account information and may include preferences information that may be retrieved by applications executing on application server 160 including user applications 165.

Figure 2:
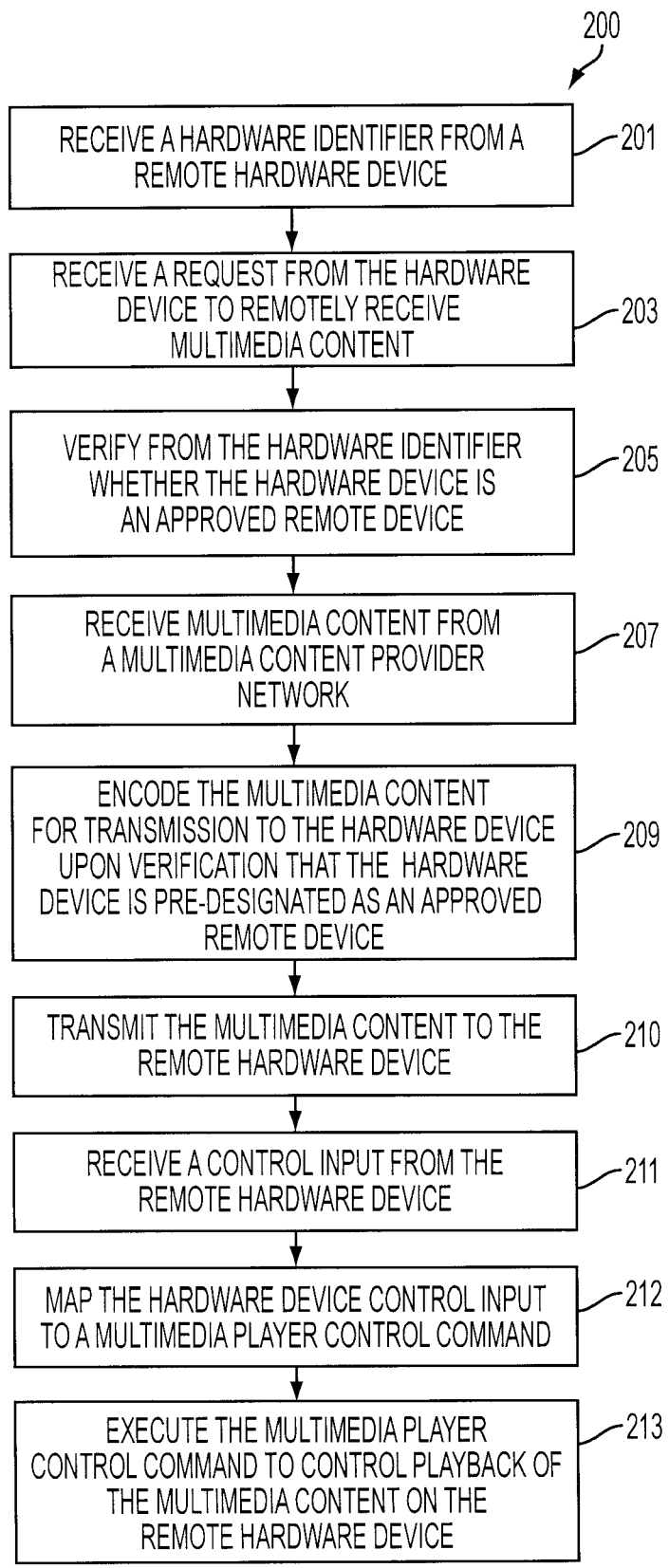
FIG. 2 illustrates selected operations in a methodology for providing remote access to multimedia content in accordance with disclosed embodiments.

FIG. 2 depicts selected operations of an embodiment of a method 200 for providing access to multimedia content to a remote hardware device such as a mobile telephone. As shown, method 200 includes receiving (operation 201) a hardware identifier from a remote hardware device. The hardware identifier may be received by a CPE device, such as an STB. The CPE device receives (operation 203) a request from the hardware device to remotely receive multimedia content. The CPE device verifies (operation 205) from the hardware identifier whether the remote hardware device is an approved remote device. If the hardware device is an approved remote device, multimedia content is received (operation 207) from a multimedia content provider network. The multimedia content is encoded (operation 209) for transmission to the hardware device upon verification that the hardware device is pre-designated as an approved remote device. The multimedia content is transmitted (operation 210) to the remote hardware device. A control input is received (operation 211) from the remote hardware device and the remote hardware device control input is mapped (operation 212) to a multimedia player control command. The multimedia control command is executed (operation 213) to control playback of the multimedia content on the remote hardware device.

Figure 3:
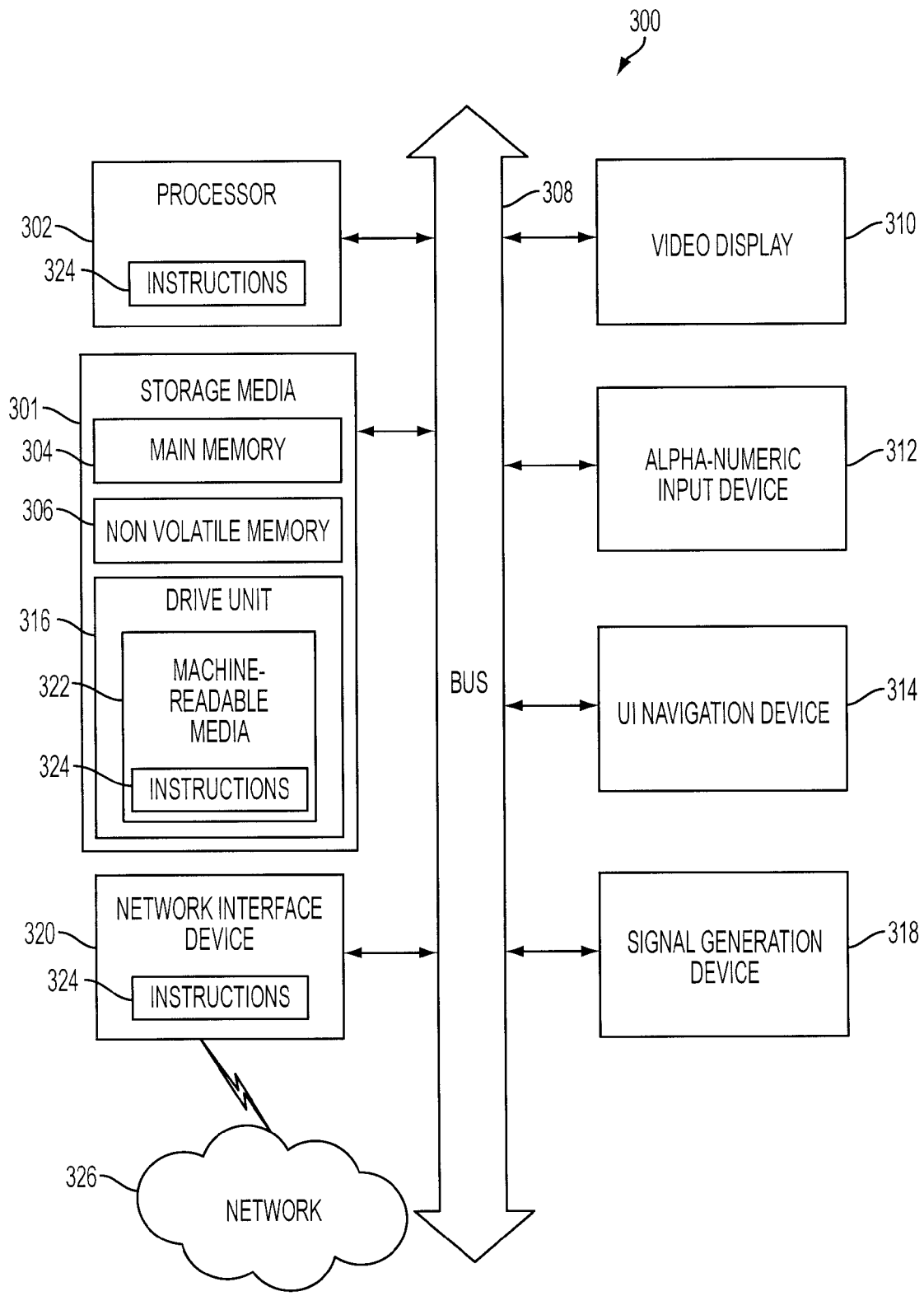
FIG. 3 illustrates a data processing system for use with disclosed embodiments to manage remote access to multimedia content.

FIG. 3 illustrates in block diagram form a data processing system 300 within which a set of instructions may operate to perform one or more of the methodologies discussed herein. Data processing system 300 may operate as a standalone device or may be connected (e.g., networked) to other data processing systems. In a networked deployment, data processing system 300 may operate in the capacity of a server or a client data processing system in a server-client network environment, or as a peer computer in a peer-to-peer (or distributed) network environment. Example data processing systems include, but are not limited to an encoder, a digital video recorder (DVR), a personal computer (PC), a tablet PC, an STB, a cable box, a satellite box, an EPG box, a personal data assistant, a remote hardware device, a cellular telephone, a smart phone, a web appliance, a network router, a switch, a bridge, a server, or any machine capable of executing a set of instructions (sequential or otherwise) that specify actions to be taken by that machine. Further, while only a single data processing system is illustrated, the term "data processing system" shall also be taken to include any collection of data processing systems that individually or jointly execute a set (or multiple sets) of instructions to perform any one or more of the methodologies discussed herein.

As shown, data processing system 300 includes a processor 302 (e.g., a central processing unit, a graphics processing unit, or both), and a storage media 301 that includes a main memory 304 and a non-volatile memory 306. As shown, elements such as storage media 301 and processor 302 may communicate with each other via a bus 308. In some embodiments, the main memory 304 and/or the non-volatile memory 306 may be used to store the indicators or values that relate to multimedia content accessed or requested by a consumer. Data processing system 300 may further include a video display unit 310 (e.g., a television, a liquid crystal display or a cathode ray tube) on which to display multimedia content such as pay-per-view sporting events, television programs, VOD movies, and the like. Data processing system 300 also includes an alphanumeric input device 312 (e.g., a keyboard or a remote control), a user interface (UI) navigation device 314 (e.g., a remote control or a mouse), a disk drive unit 316, a signal generation device 318 (e.g., a speaker) and a network interface device 320. As shown, drive unit 316 is included within storage media 301. The input device 312 and/or the UI navigation device 314 (e.g., the remote control) may include a processor (not shown), and a memory (not shown). The disk drive unit 316 includes a machine-readable medium 322 that may have stored thereon one or more sets of instructions and data structures (e.g., instructions 324) embodying or utilized by any one or more of the methodologies or functions described herein. The instructions 324 may also reside, completely or at least partially, within the main memory 304, within non-volatile 306, within network interface device 320, and/or within the processor 302 during execution thereof by the data processing system 300.

The instructions 324 may be transmitted or received over a network 326 (e.g., a multimedia content provider) via the network interface device 320 utilizing any one of a number of transfer protocols (e.g., broadcast transmissions, HTTP). While the machine-readable medium 322 is shown in an example embodiment to be a single medium, the term "machine-readable medium" should be taken to include a single medium or multiple media (e.g., a centralized or distributed database, and/or associated caches and servers) that store the one or more sets of instructions. Also, the term "machine-readable medium" should be taken to include any medium that is capable of storing, encoding or carrying a set of instructions for execution by the machine (i.e., data processing system) and that cause the machine to perform any one or more of the disclosed methodologies, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

In accordance with the disclosed embodiment, instructions 324 are stored on at least one computer readable media and enable data processing system 300 to provide remote access to multimedia content. Accordingly, instructions 324 may include instructions for receiving a globally unique identifier from a hardware device, and verifying the globally unique identifier as associated with a pre-approved device. Further, instructions 324 receive a content request from the remote hardware device, encode multimedia content received from a provider network for transmission to the remote hardware device, and transmit the encoded multimedia content to the remote hardware device.

Figure 4:
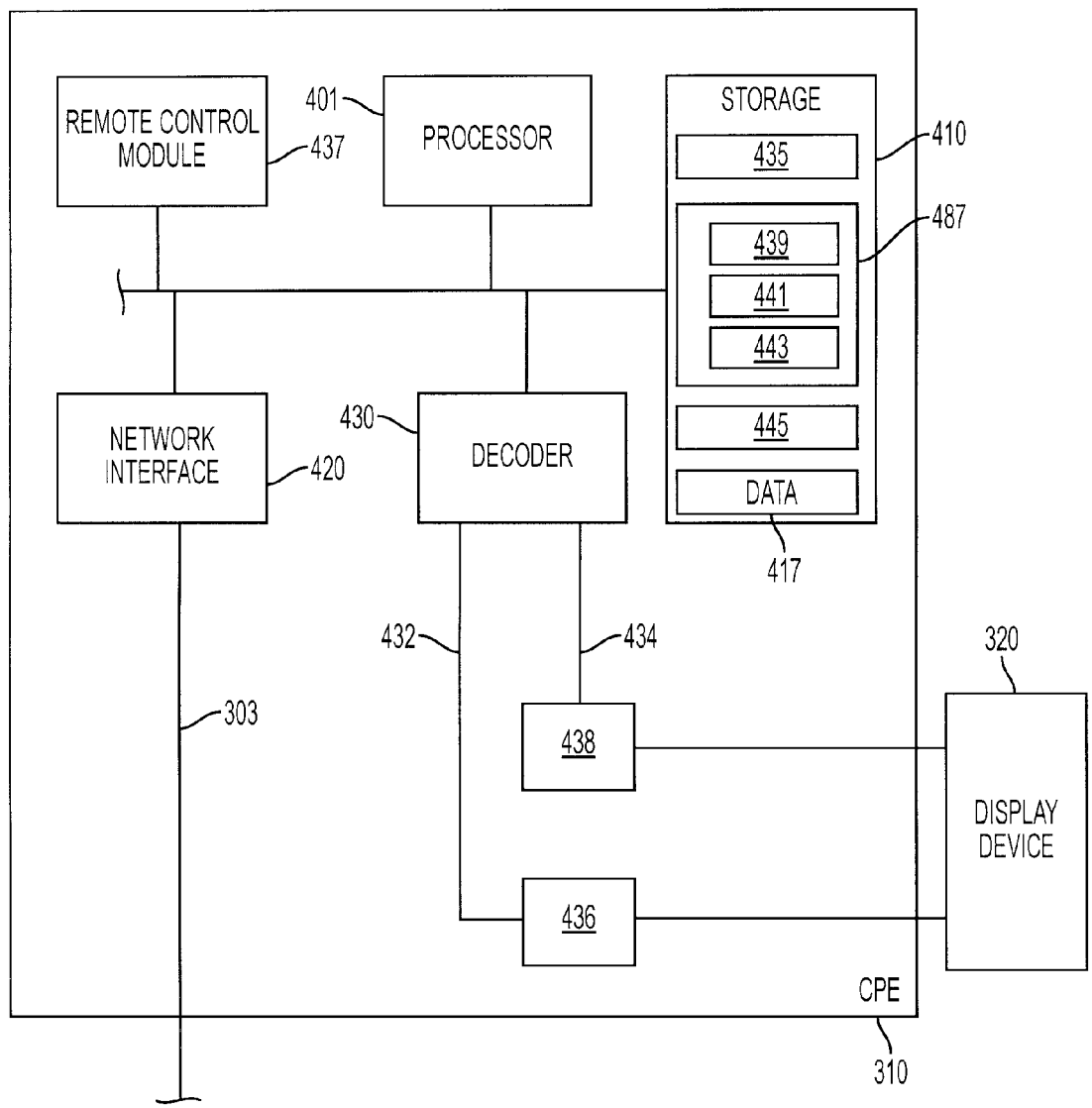
FIG. 4 is a block diagram of selected elements of an embodiment of a set-top box (STB) from FIG. 1 for providing remote access to multimedia content.

Referring now to FIG. 4, a block diagram illustrates selected elements of an embodiment of CPE 310. CPE 310 may be an STB or other localized equipment for providing a user with access in usable form to multimedia content such as digital television programs. In this implementation, CPE 310 includes a processor 401 and general purpose storage 410 connected to a shared bus. A network interface 420 enables CPE 310 to communicate with LAN 303 (e.g., LAN 123 from FIG. 1). An integrated audio/video decoder 430 generates native format audio signals 432 and video signals 434. Signals 432 and 434 are encoded and converted to analog signals by digital-to-analog (DAC)/encoders 436 and 438. The output of DAC/encoders 436 and 438 is suitable for delivering to an NTSC, PAL, or other type of display device 320. Network interface 420 may also be adapted for receiving information from a remote hardware device, such as a globally unique identifier and control signals for a remote hardware device to control playback of multimedia content transmitted by CPE 310. Remote control module 437 processes user inputs from remote control devices and, in some cases, may process outgoing communications to two-way remote control devices. General purpose storage 410 includes non-volatile memory 435, main memory 445, and drive unit 487. As shown, drive unit 436 includes verification module 439, processing module 441, and mapping module 443. In accordance with disclosed embodiments, verification module 439 receives a globally unique identifier of a remote hardware device and verifies whether the remote hardware device is pre-designated as an approved hardware device for receiving remote multimedia content from CPE 310. Processing module 441 is responsible for processing content requests from the remote hardware device and initiating playback and transmission of the multimedia content to the remote hardware device. Mapping module 443 receives control input from the remote hardware device and maps the remote hardware device control input to a multimedia player control command. In turn, processing module 441 executes the multimedia player control command to control playback of the multimedia content on the remote hardware device. Data 417 may include information regarding all pre-designated remote hardware devices and may be accessed by verification module 439 in determining whether a remote hardware device is pre-designated as approved. In some embodiments, CPE 310 receives a request from a remote hardware device to interact with a DVR user interface. Once the remote hardware device is authorized as a pre-designated device, CPE 310 transmits DVR user interface data to the remote hardware device. CPE 310 then receives input from the remote hardware device, permitting the remote hardware device to communicate in an interactive way with the DVR user interface. In response to user inputs to the DVR user interface received from the remote hardware device, CPE 310 is enabled, in some embodiments, to perform the requested DVR function on CPE 310. For example, in response to user input from the remote hardware device to rewind, fast forward, or pause the transmission of multimedia content, CPE 310 complies with the request. In this way, the remote hardware device and CPE 310 are enabled to allow a user to remotely control DVR functionality of CPE 310. This would include, in some embodiments, the ability for the remote hardware device to program DVR functionality in CPE 310 without necessarily playing back real time multimedia content.

Figure 5:
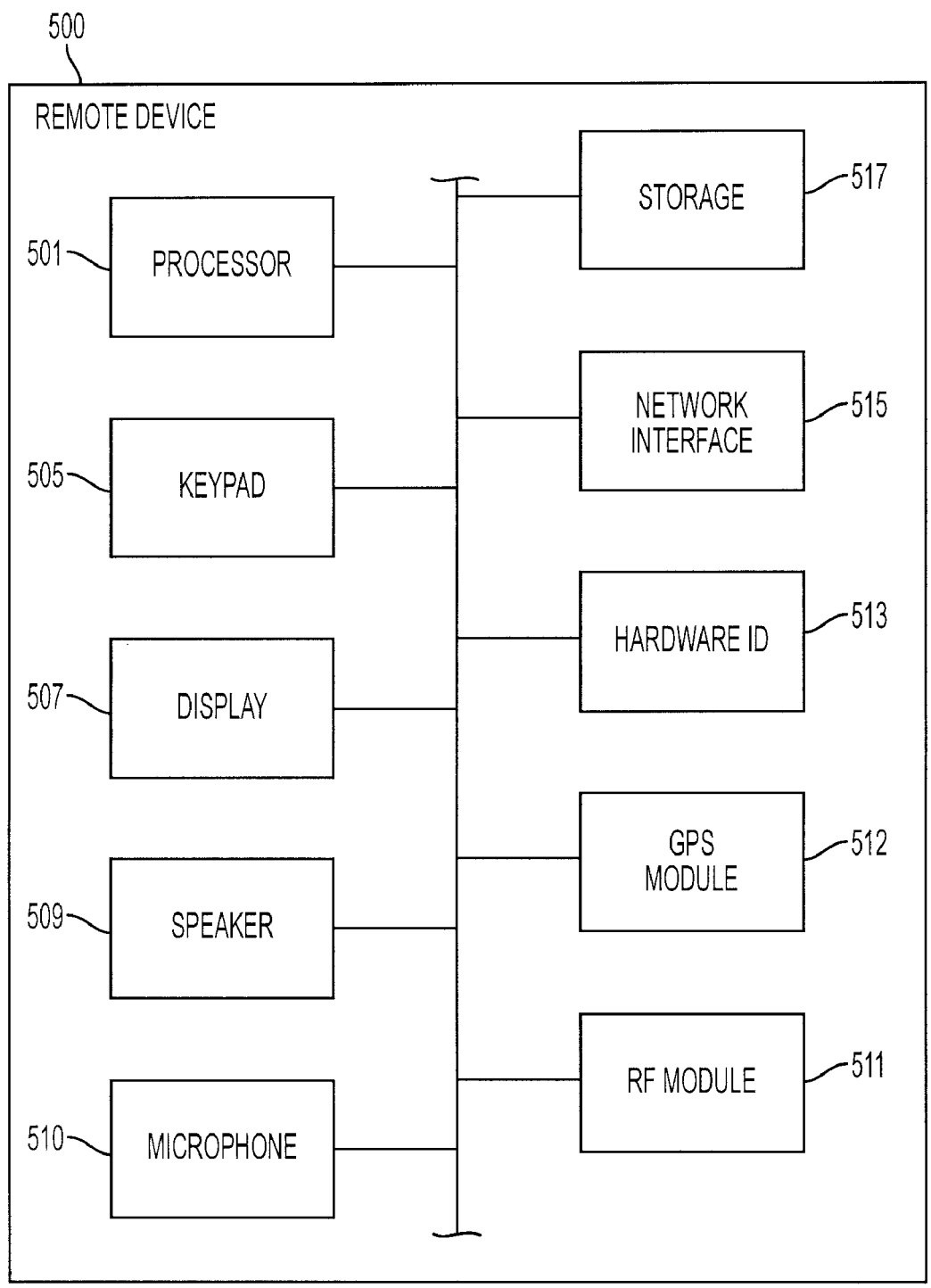
FIG. 5 is a block diagram of selected elements of an embodiment of a remote hardware device used for remotely accessing multimedia content.

Referring now to FIG. 5, an embodiment of a remote device 500 is illustrated. As shown, remote device 500 includes processor 501 and general purpose storage 517 connected to a shared bus. Storage 517 may include disk drives, non-volatile memory, and random access memory, as examples. Storage 517 may include an operating system and other computer readable instructions for providing remote device 500 with functionality for verifying to CPE 310 (FIG. 4) that it is a pre-approved remote hardware device. Storage 517 may be used for storing a unique hardware address or globally unique identifier for remote device 500. As shown, remote device 500 includes keypad 505 for accepting user input regarding requested content, for example. Display 507 is enabled for displaying the received multimedia content which may be streaming digital television content, for example. In some embodiments, display 507 is a touch screen used for receiving user inputs to request the transmission of multimedia content to remote device 500. Speaker 509 is for playing audio portions of received multimedia content. Microphone 510, RF module 511, and global positioning system (GPS) module 512 are included in remote device 500 to support its combined functionality as a mobile telephone and navigation device; however, some embodiments of remote device 500 may not have such functionality. Network interface 515 may be a wired or wireless connection to an IP protocol network, for example, to allow remote device 500 a further means for communicating with CPE device 310, for example. Hardware identifier 513, as shown, is separate from storage 517, but may be incorporated therein. Hardware identifier 513 may be an international mobile equipment identity (IMEI) or any number that is effectively unique to remote device 500. Such IMEI numbers may be used by a content provider network to identify valid devices and to stop a stolen phone from accessing the network, for example.

While the disclosed subject matter has been described in connection with one or more embodiments, the disclosed embodiments are not intended to limit the subject matter of the claims to the particular forms set forth. On the contrary, disclosed embodiments are intended to encompass alternatives, modifications, and equivalents.

What is claimed is:

1. A customer premises equipment device for providing a remote hardware device with remote access to multimedia content, the customer premises equipment device comprising:
    a first input enabled for receiving a hardware identifier that is associated with the remote hardware device that, when received, pre-designates the remote hardware device as approved;
    a second input enabled for receiving a request from the remote hardware device to remotely receive the multimedia content;
    a processor enabled for:
        based on the hardware identifier, verifying that the remote hardware device has been pre-designated as approved;
        transmitting the multimedia content to the remote hardware device upon verification that the remote hardware device has been pre-designated as approved;
        responsive to receiving a remote hardware device request to interact with a digital video recorder user interface, transmitting digital video recorder user interface data to the remote hardware device; and
        responsive to receiving, from the remote hardware device, digital video recorder user interface input indicating a requested digital video recorder function, performing the requested digital video recorder function;
    a receiver for receiving the multimedia content from a multimedia content provider network; and
    a transmitter enabled for transmitting the multimedia content to the remote hardware device,
    wherein the hardware identifier is an International Mobile Equipment Identity number associated with the remote hardware device.

2. The customer premises equipment device of claim 1, wherein the transmission of the multimedia content occurs substantially in real time as it is streamed to the customer premises equipment device.

3. The customer premises equipment device of claim 1, wherein the transmission of the multimedia content occurs substantially in real time as the multimedia content is displayed on the remote hardware device.

4. The customer premises equipment device of claim 1, wherein the transmitter is further enabled for simulcasting the multimedia content to a plurality of remote hardware devices that have each been pre-designated as approved.

5. The customer premises equipment device of claim 1, wherein the transmitter supports real time transport protocol.

6. The customer premises equipment device of claim 1, wherein the transmitter supports real data transport protocol.

7. The customer premises equipment device of claim 1, wherein transmitting the multimedia content includes downloading the multimedia content to a storage media locally coupled to the remote hardware device for later playing on the remote hardware device.

8. The customer premises equipment device of claim 7, wherein the remote hardware devices is a cellular telephone and wherein the customer premises equipment device further comprises:
    a storage for recording the multimedia content, wherein after recording, the multimedia content is available for later transmission to the remote hardware device.

9. The customer premises equipment device of claim 8, wherein the second input is further enabled for receiving input from the remote hardware device to pause, stop, fast forward, and rewind the multimedia content and wherein the customer premises equipment device is enabled to control playback of the multimedia content on the customer premises equipment in response.

10. The customer premises equipment device of claim 9, wherein the transmitter is further enabled for transmitting data for a graphical user interface to the remote hardware device; and wherein the second input is further enabled for receiving input made to the graphical user interface at the remote hardware device for controlling a flow of the transmission of the multimedia content.

11. The customer premises equipment device of claim 10, wherein the input received at the second input includes HTML commands.

12. The customer premises equipment device of claim 10, wherein the input received at the second input includes XML commands.

13. The customer premises equipment of claim 1, wherein the processor is enabled for:
    when the International Mobile Equipment Identity number indicates that the remote hardware device is stolen, stopping the transmitter from transmitting the multimedia content to the remote hardware device.

14. A computer program product stored on at least one non-transitory computer readable media, the computer program product enabled for providing a hardware device with remote access to multimedia content, the computer program product comprising instructions for:
- receiving a globally unique identifier of the hardware device, wherein the globally unique identifier includes an International Mobile Equipment Identity number associated with the hardware device; and
- responsive to verifying the globally unique identifier as pre-designated:
  - receiving a content request from the hardware device;
  - encoding multimedia content received from a provider network for transmission to the hardware device; and
  - transmitting the multimedia content to the hardware device;
  - transmitting digital video recorder user interface data to the hardware device; and
  - responsive to receiving, from the hardware device, digital video recorder user interface input indicating a requested digital video recorder function, performing the requested digital video recorder function.

15. The computer program product of claim 14, further comprising instructions for:
- transmitting data for a graphical user interface to the hardware device, wherein the graphical user interface enables remote control of transmission of the multimedia content.

16. The computer program product of claim 15, further comprising instructions for:
- responding to received input from the hardware device by controlling the transmission of the multimedia content.

17. The computer program product of claim 16, wherein the received input from the hardware device includes a HTML input.

18. The computer program product of claim 16, wherein the received input from the hardware device includes an XML document.

19. The computer program product of claim 14, further comprising instructions for:
- when the International Mobile Equipment Identity number indicates that the hardware device is stolen, stopping the transmitting of the multimedia content to the hardware device.

20. A method of providing a remote hardware device with remote access to multimedia content, the method comprising:
- detecting a globally unique hardware identifier associated with the remote hardware device, wherein the globally unique hardware identifier includes an International Mobile Equipment Identity number associated with the remote hardware device;
- receiving a request from the remote hardware device to remotely receive the multimedia content;
- verifying that the globally unique hardware identifier corresponds to an approved hardware device;
- receiving the multimedia content from a multimedia content provider network;
- encoding the multimedia content for transmission to the remote hardware device upon verification that the remote hardware device has been approved and not encoding the multimedia content for transmission if the remote hardware device has not been approved;
- receiving an input from the remote hardware device to control the transmission of the multimedia content;
- transmitting the multimedia content to the remote hardware device in response to the input received from the remote hardware device;
- transmitting digital video recorder user interface data to the remote hardware device; and
- responsive to receiving, from the remote hardware device, digital video recorder user interface input indicating a requested digital video recorder function, performing the requested digital video recorder function.

21. The method of claim 20, wherein the remote hardware device is a cellular telephone and wherein the input from the remote hardware device includes a HTML command.

22. The method of claim 20, wherein the input from the remote hardware device includes an XML document.

23. The method of claim 20, further comprising:
- when the International Mobile Equipment Identity number indicates that the remote hardware device is stolen, stopping the transmitting of the multimedia content to the remote hardware device.

* * * * *